US011889248B2

(12) United States Patent
Meng et al.

(10) Patent No.: US 11,889,248 B2
(45) Date of Patent: Jan. 30, 2024

(54) MEMS MICROPHONE

(71) Applicant: AAC Acoustic Technologies (Shenzhen) Co., Ltd., Shenzhen (CN)

(72) Inventors: Zhenkui Meng, Shenzhen (CN); Zhengyan Liu, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 829 days.

(21) Appl. No.: 16/708,409

(22) Filed: Dec. 9, 2019

(65) Prior Publication Data

US 2020/0213690 A1 Jul. 2, 2020

(30) Foreign Application Priority Data

Dec. 31, 2018 (CN) ......................... 201822279342.8

(51) Int. Cl.
*H04R 1/02* (2006.01)
*H04R 19/00* (2006.01)
*H04R 19/01* (2006.01)

(52) U.S. Cl.
CPC ........... *H04R 1/021* (2013.01); *H04R 19/005* (2013.01); *H04R 19/016* (2013.01); *H04R 2201/003* (2013.01)

(58) Field of Classification Search
CPC ............ B81B 2201/0257; B81B 3/001; B81B 3/0021; B81B 2203/0127; B81B 2203/0315; B81B 2203/04; B81C 1/00134; B81C 1/00158; B81C 1/00182; H04R 1/021; H04R 19/005; H04R 19/016; H04R 2201/003
See application file for complete search history.

(56) References Cited

U.S. PATENT DOCUMENTS

2015/0001647 A1* 1/2015 Dehe ...................... H04R 31/00 257/416
2016/0167946 A1* 6/2016 Jenkins ................ H04R 19/005 257/416
2018/0146296 A1* 5/2018 Meisel ................. H04R 19/005
2019/0023562 A1* 1/2019 Fueldner ............. B81C 1/00182
2020/0204925 A1* 6/2020 Zou .......................... H04R 7/02
2020/0365447 A1* 11/2020 Mays .................... C23C 16/045

FOREIGN PATENT DOCUMENTS

CN 103702268 B2 4/2014
CN 107666645 A * 2/2018 ............ H04R 1/406
CN 107835477 B2 3/2018

OTHER PUBLICATIONS

PCT search report dated Jan. 15, 2020 by SIPO in related PCT Patent Application No. PCT/CN2019/113317 (4 Pages).

* cited by examiner

*Primary Examiner* — Carolyn R Edwards
*Assistant Examiner* — Julie X Dang
(74) *Attorney, Agent, or Firm* — W&G Law Group

(57) ABSTRACT

The present invention provides a MEMS microphone, including: a base with a back cavity; and an electric capacitance system arranged on the base. The electric capacitance system includes a back plate, a first diaphragm and a second diaphragm opposite to the back plate and arranged on an upper and lower sides of the back plate. The MEMS microphone further includes an insulation layer isolating the base, the back plate, the first diaphragm and the second diaphragm, and a sealing space formed between the first diaphragm and the second diaphragm. The pressure in the sealing space is equal to an external pressure.

7 Claims, 1 Drawing Sheet

MEMS MICROPHONE

FIELD OF THE PRESENT INVENTION

The present invention relates to transducers for converting sound waves into electrical signals, in particular to a micro-electro-mechanical systems (MEMS) microphone.

DESCRIPTION OF RELATED ART

With the development of wireless communication, the users have increasingly higher requirements for the call quality of mobile phones, and the design of microphone as a speech pickup device has a direct influence on the call quality of mobile phone.

As MEMS technology is featured by miniaturization, good integratability, high performance, low cost and the like, it has been appreciated by the industry, and MEMS microphone is widely used in current mobile phones; the common MEMS microphone is capacitive, i.e., including a vibrating diaphragm and a back plate which both constitutes a MEMS acoustic sensing capacitance, and the MEMS acoustic sensing capacitance further outputs an acoustic signal to a processing chip for signal processing by connecting to the processing chip through a connecting plate. To further improve the performance of MEMS microphone, a dual-diaphragm MEMS microphone structure has been proposed in the prior art, i.e., two layers of vibrating diaphragm are used to constitute a capacitance structure with the back plate respectively.

However, the pressure in the space between the back plate and the diaphragm is usually less than the external pressure or vacuum. The environmental pressure makes the diaphragm deflect, which reduces the reliability and sensitivity of MEMS devices.

Therefore, it is necessary to provide an improved MEMS microphone with equal internal and external pressure.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present invention.

DETAILED DESCRIPTION OF THE EXEMPLARY EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the invention, not intended to limit the invention.

Figure 1:
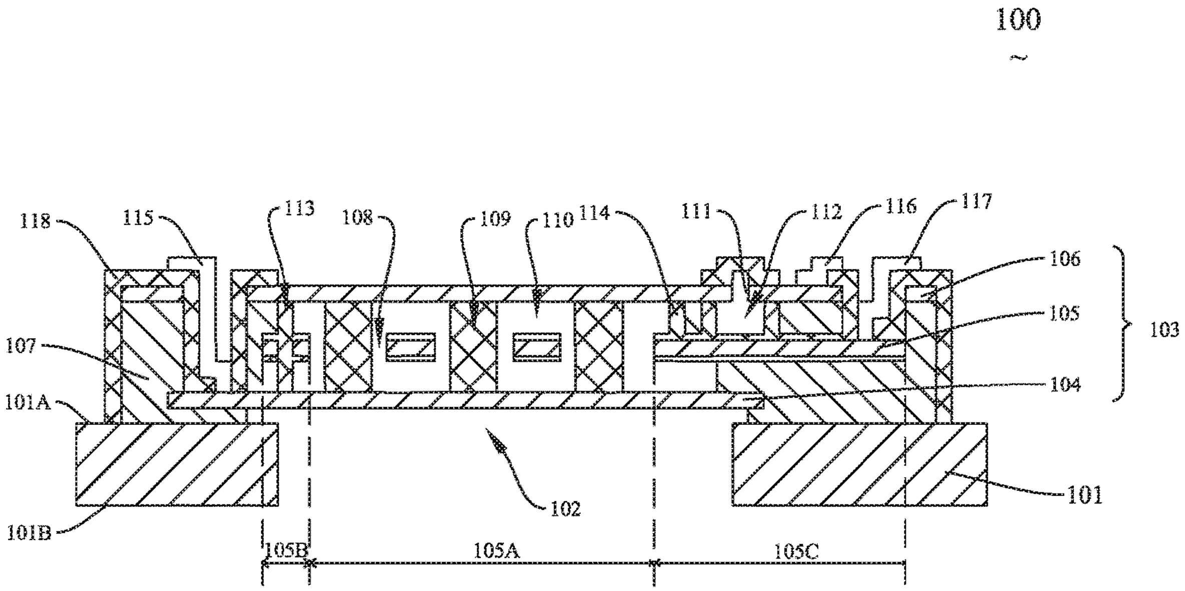
FIG. 1 is a structural diagram of a MEMS microphone in one embodiment of the present invention.
Figure 2:
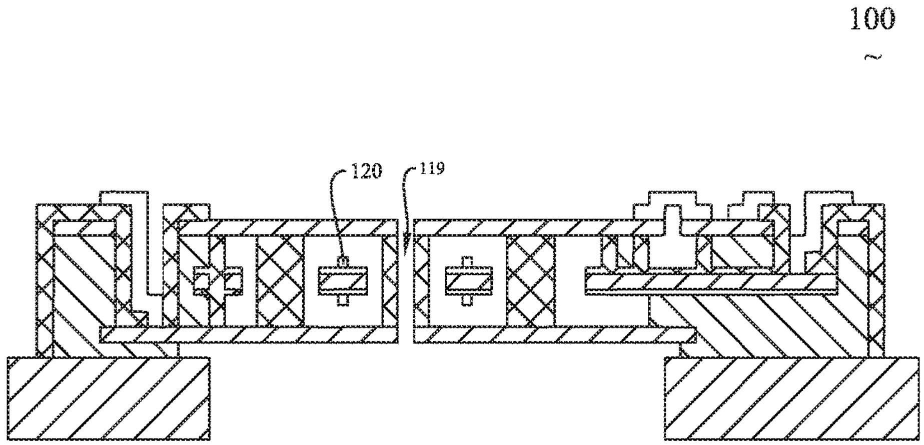
FIG. 2 is a structural diagram of a MEMS microphone in another embodiment of the present invention.

Referring to FIGS. 1-2, the MEMS microphone structure 100 proposed by the present invention includes a base 101 and an electric capacitance system 103 arranged on the base 101 and connected with the base 101 isolatively.

The material of the base 101 is preferably semiconductor material, such as silicon, which has a back cavity 102, a first surface 101A and a second surface 101B opposite to the first surface, an insulation layer 107 provided on the first surface 101A of the base 101 with a back cavity 102 through the insulation layer 107, and the first and second surfaces of the base 101. Wherein the back cavity 102 can be formed through corrosion by a bulk-silicon process and dry method.

The capacitance system 103 comprises a back plate 105 and a first vibrating diaphragm 104 and a second vibrating diaphragm 106 provided opposite to the back plate 105 at the two upper and lower sides of the back plate 105 respectively, with an insulation layer 107 provided between all the first vibrating diaphragm 104 and the back plate 105, the second vibrating diaphragm 106 and the back plate 105, the vibrating diaphragm 104 and the base 101. The central main body area 105A of the back plate 105 includes an acoustic through-hole 108 arranged at intervals. In the present invention, the central main body area of the back plate 105 is, for example, the area corresponding to the back cavity 102, and the area outside the area is the edge area of the back plate 105, and the areas on the left and right sides are respectively the first edge area 105B and the second edge area 105C. The supporting part 109 penetrates through the acoustic through hole 108 to fixedly connect the first vibrating diaphragm 104 with the second vibrating diaphragm 106. Specifically, the supporting part 109 is abutted with a top surface of the first vibrating diaphragm 104 and a bottom surface of the second vibrating diaphragm 106 respectively. The acoustic through hole 108 communicates with the area between the first vibrating diaphragm 104 and the second vibrating diaphragm 106 to form an internal cavity 110. When the MEMS microphone is powered on to work, the first vibrating diaphragm 104 and the back plate 105, the second vibrating diaphragm 106 and the back plate 105 will carry charges of opposite polarity to form capacitance, when the first vibrating diaphragm 104 and the second vibrating diaphragm 106 vibrate under the action of acoustic wave, the distance between the back plate 105 and the first vibrating diaphragm 104, between it and the second vibrating diaphragm 106 will change, so as to cause changes in capacitance of the capacitance system, which in turn converts the acoustic wave signal into an electrical signal to realize corresponding functions of the microphone.

In this embodiment, the first vibrating diaphragm 104 and the second vibrating diaphragm 106 are square, round or elliptical, at least one supporting part 109 is placed between the bottom surface of the first vibrating diaphragm 104 and the top surface of the second vibrating diaphragm 106.

The supporting part 109 is placed to penetrate through the acoustic through hole 108 of the back plate 105 to fixedly connect the first vibrating diaphragm 104 and the second vibrating diaphragm 106; i.e., the supporting part 109 has no contact with the back plate 105 and no influence from the back plate 105.

The supporting part 109 can be formed on the top surface of the first vibrating diaphragm 104 with all kinds of preparing technology, such as physical vapor deposition, electrochemical deposition, chemical vapor deposition and molecular beam epitaxy.

The supporting part 109 can be constituted by semiconductor material such as silicon or can comprise semiconductor material such as silicon. For example, germanium, SiGe, silicon carbide, gallium nitride, indium, indium gallium nitride, indium gallium arsenide, indium gallium zinc oxide or other element and/or compound semiconductor (e.g., III-V compound semiconductor or II-VI compound semiconductor such as gallium arsenide or indium phosphide, or ternary compound semiconductor or quaternary compound semiconductor). It can also be constituted by or comprise at least one of the followings: metal, dielectric material, piezoelectric material, piezo-resistive material and ferroelectric material. It can also be made from dielectric material such as silicon nitride.

According to the embodiments, the supporting part 109 can be integrally molded with the first vibrating diaphragm 104 and the second vibrating diaphragm 106.

According to each embodiment, the second diaphragm 106 of the present invention includes a releasing hole 111. The releasing hole 111 is sealed by a dielectric material 112.

According to various embodiments, the first edge area 105B of the present invention includes a first barrier releasing structure 113 penetrating the back plate to isolate the acoustic through hole 108 and the insulation layer 107; the second edge area 105C includes a plurality of second barrier releasing structure 114 spaced on the back plate 105, and the second barrier releasing structure is separated from the acoustic through hole 108 and the insulation layer 107.

The releasing hole 111 is communicated with the internal cavity 110, so it allows to eliminate the sacrifice oxidation layer inside the internal cavity 110 by using a releasing solution such as BOE solution or HF vapor-phase etching technology, as the barrier releasing structures 113, 114 exist, the insulation layer 107 between the first vibrating diaphragm and the second vibrating diaphragm is preserved.

According to the embodiments, it also comprises the extraction electrodes of the first vibrating diaphragm 104, the second vibrating diaphragm 106 and the back plate 105, correspondingly a first electrode 115, a second electrode 116, a third electrode 117.

According to the embodiments, it also comprises a passivation protective layer of surface 118 which simultaneously has a function to achieve mutual insulation among the first electrode 115, the second electrode 116, the third electrode 117.

Refer to FIG. 2, the EMMS microphone further comprises a through hole 119 through the first vibrating diaphragm 104, the supporting part 109, the second vibrating diaphragm 106, the through hole 119, for example, is placed at the central position of the first vibrating diaphragm 104, the second vibrating diaphragm 106, communicating the back cavity 102 with the external environment, thus resulting in a consistent external pressure of the first vibrating diaphragm 104 and the second vibrating diaphragm 106. It also includes a bump 120 arranged on the upper and lower surfaces of the back plate 105. The bump 120 is conducive to preventing the back plate 105 from adhering to the first diaphragm 104 and the second diaphragm 106.

The structure of the present invention is made by conventional semiconductor process, wherein the insulation layer 107 is silicon dioxide, the material of the first diaphragm and the second diaphragm is polycrystalline silicon material, and the back plate is a composite laminated structure composed of polycrystalline silicon whose upper and lower surfaces are all silicon nitride.

In the MEMS microphone structure provided by the present invention, the pressure in the inner cavity of the double diaphragm is the same as that of the outside, the influence of the environmental pressure on the performance of the device is avoided, and the reliability and sensitivity of the device are improved.

It is to be understood, however, that even though numerous characteristics and advantages of the present exemplary embodiments have been set forth in the foregoing description, together with details of the structures and functions of the embodiments, the invention is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS microphone, including:

a base with a back cavity;

an electric capacitance system arranged on the base, including a back plate, a first diaphragm and a second diaphragm opposite to the back plate and arranged on an upper and lower sides of the back plate;

an insulation layer isolating the base, the back plate, the first diaphragm and the second diaphragm;

a sealing space formed between the first diaphragm and the second diaphragm; wherein the back plate comprises an intermediate main body area, a first edge area on one side of the intermediate main body area and a second edge area on the other side of the intermediate main body; a plurality of acoustic through holes are spaced in the intermediate main body area, and a plurality of supporting components penetrates through the acoustic through holes for connecting the first diaphragm to the second diaphragm, the MEMS microphone comprises a first release barrier structure located in the first edge area and penetrating the back plate, the first release barrier structure isolates the acoustic through hole and the insulation layer; the MEMS microphone further comprises a plurality of second release barriers located in the second edge area and spaced on the back plate; the second release barrier structure isolates the acoustic through hole from the insulation layer, a pressure in the sealing space is equal to an external pressure.

2. The MEMS microphone as described in claim 1, further including a through hole through which a geometric center of the diaphragm is set and through the supporting component.

3. The MEMS microphone as described in claim 1, further including a releasing hole through the second diaphragm and arranged in the second edge area, and the releasing hole is filled with dielectric material.

4. The MEMS microphone as described in claim 3, wherein the releasing hole and the acoustic through hole are at least separated by two second barrier releasing structure.

5. The MEMS microphone as described in claim 1, further comprising an extraction electrode corresponding to the first diaphragm, the second diaphragm and the back plate.

6. The MEMS microphone as described in claim 5, further including a passivation protection layer to isolate the extraction electrode of the first diaphragm, the second diaphragm and the back plate.

7. The MEMS microphone as described in claim 5, wherein the upper and lower surfaces of the back plate are provided with a number of bumps for preventing the first diaphragm and the second diaphragm from adhering to the back plate.

* * * * *